United States Patent [19]

Burrows

[11] Patent Number: 5,779,323
[45] Date of Patent: Jul. 14, 1998

[54] SPOKED WHEEL WITH AERODYNAMIC AND RIGIDITY IMPARTING SPOKES

[75] Inventor: Mike Burrows, Norwich, England

[73] Assignee: Giant Manufacturing Co., Ltd., Taipei, Taiwan

[21] Appl. No.: 845,692

[22] Filed: Apr. 25, 1997

[51] Int. Cl.$^6$ ...................................................... B60B 1/02
[52] U.S. Cl. ........................... 301/58; 301/59; 301/104
[58] Field of Search ............................... 301/55, 56, 58, 301/59, 61, 64.7, 104, 110.5, 110.6

[56] References Cited

U.S. PATENT DOCUMENTS

| | | | |
|---|---|---|---|
| 1,814,531 | 7/1931 | Stoler | 301/58 X |
| 4,729,605 | 3/1988 | Imao et al. | 301/104 |
| 4,930,843 | 6/1990 | Lewis | 301/64.7 |
| 5,080,444 | 1/1992 | Hopkins et al. | 301/97 |
| 5,110,190 | 5/1992 | Johnson | 301/55 |
| 5,246,275 | 9/1993 | Arredondo | 301/64.7 |
| 5,350,221 | 9/1994 | Pearce et al. | 301/104 |
| 5,489,147 | 2/1996 | Borsai | 301/59 |

FOREIGN PATENT DOCUMENTS

| | | | |
|---|---|---|---|
| 111118 | 8/1940 | Australia . | |
| 554537 | 1/1923 | France | 301/104 |
| 1000520 | 12/1996 | Netherlands . | |
| 4388 | of 0000 | United Kingdom | 301/104 |

| | | | |
|---|---|---|---|
| 9504666 | 2/1995 | WIPO . | |

*Primary Examiner*—Russell D. Stormer
*Attorney, Agent, or Firm*—Webb Ziesenheim Bruening Logsdon Orkin & Hanson, P.C.

[57] ABSTRACT

A spoked wheel includes a wheel rim, a wheel hub, and a plurality of spokes that are formed integrally from fiber reinforced plastic and that interconnect the wheel rim and wheel hub. Each spoke has an intermediate portion with a symmetrical oval cross-section, a nub larger than spoke apertures in hub flanges of the wheel hub, and a bend interconnecting the nub and the intermediate portion. The bend changes gradually from the circular cross-section of the nub to the oval cross-section of the intermediate portion. The nub and the bend have abutment faces which contact tightly inclined faces of a corresponding spoke aperture so as to secure the nub and the bend on inner and outer sides of the hub flange. Each spoke further has a foot portion and a transitional portion extending from the intermediate portion and changing gradually from the oval cross-section to an elliptical cross-section of the foot portion. Each of a plurality of washers is disposed between the wheel rim and one of the spokes. Each of a plurality of spoke fasteners extends through the wheel rim and one of the washers, and engages a metal fastener axially embedded in the foot portion of one of the spokes so that the spokes can be placed under tension when connecting the wheel rim to the wheel hub to impart rigidity to the spoked wheel.

4 Claims, 12 Drawing Sheets

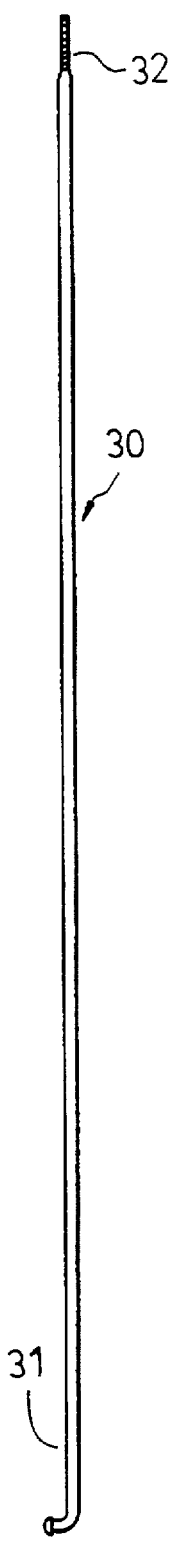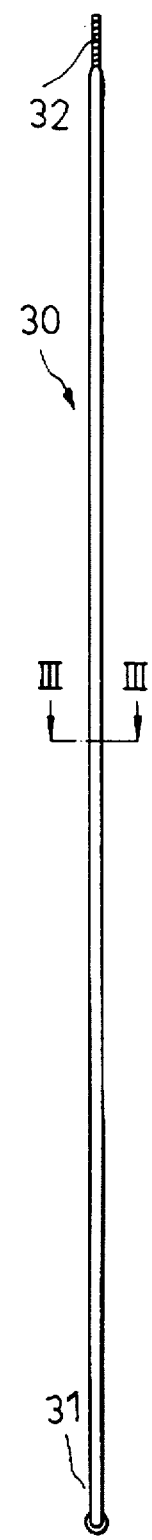
FIG.1 PRIOR ART
FIG.2 PRIOR ART 5,779,323

SPOKED WHEEL WITH AERODYNAMIC AND RIGIDITY IMPARTING SPOKES

BACKGROUND OF THE INVENTION

1. Field of the Invention

The invention relates to a spoked wheel, more particularly to a spoked wheel with spokes that impart rigidity to the wheel and that have good aerodynamic qualities.

2. Description of the Related Art

Referring to FIGS. 1 to 3, a conventional spoke 30 for a bicycle wheel is shown to have a head portion 31 for connection to a wheel hub, and a foot portion 31 for connection to a wheel rim. The conventional spoke 30 is generally made of metal wire and is usually in a tensed state to impart rigidity to the bicycle wheel. However, since the conventional spoke 30 has a circular cross-section, the bicycle wheel is subjected to a large drag force when in motion. As such, the conventional spoke 30 has poor aerodynamic qualities.

The drag coefficient is an important factor to be considered in the design of vehicles, planes and ships. A lower drag coefficient means more efficient fuel consumption. When an object is in an external flow field, the resistances experienced thereby include friction drag due to flow viscosity, and pressure drag due to a change in flow speed owing to the shape of the object. It is known that a low pressure region will be formed in the wake of the separation point of the flow. Since a high pressure region is present in front of the object, the resulting pressure difference results in a pressure drag. By designing the flow lines to delay occurrence of the separation point, the scope of the wake can be reduced to minimize the pressure drag.

The same concept can also be applied in the design of the spokes of a bicycle wheel. Lower resistance to the spokes means more efficient use of energy for powering the bicycle, thereby enabling competitors to achieve faster times. Moreover, metal is not the only material available for making the spokes. Lighter materials are preferred to reduce the total weight of the bicycle.

U.S. Pat. No. 5,350,221 discloses a fiber reinforced spoke for bicycle wheels and the like. As shown in FIGS. 4 to 8, the spoke 40 is formed integrally by injection molding and has an intermediate portion 43 with a cross-sectional symmetrical airfoil shape such that, when installed in a wheel, the dimension transverse to the direction of forward motion of the wheel is less than the dimension aligned with the direction of forward motion. The spoke 40 further has an upper transitional portion 42 that changes gradually to a circular cross-section, and an externally threaded foot portion 41 that extends from the upper transitional portion 42. The spoke 40 additionally has a lower transitional portion 44, where the cross-section gradually changes to a circular shape, a bend 45 formed on one end of the lower transitional portion 42 for attaching through a spoke aperture 611 in a hub flange 61 of a wheel hub 60, as shown in FIG. 9, and a nub 46 formed on one end of the bend 45 as an enlargement of the cross-sectional area of the bend 45 for preventing removal of the spoke 40 from the wheel hub 60.

In use, the spokes 40 are attached to the wheel hub 60, and spoke fasteners 51 extend through the wheel rim 50 and engage threadedly the foot portions 41 of the spokes 40. As such, the spokes 40 can be placed under tension to impart rigidity to the wheel.

The spokes 40 offer the advantages of good aerodynamic qualities, and reduced weight, improved strength and shock absorption owing to the use of fiber reinforced plastic. While the spokes 40 can be used to replace the conventional metal spokes 30 described beforehand, they still suffer from the following drawbacks:

1. The spokes 40 are inconvenient to install. It is noted that the spokes 40 are adapted for use with a conventional wheel rim 50 and a conventional wheel hub 60. Each hub flange 61 of the conventional wheel hub 60 is usually formed with eighteen spoke apertures 611. Therefore, thirty-six spokes 40 are needed to form the wheel. In addition, since the intermediate portion 43 of the spokes 40 must be oriented such that the dimension transverse to the direction of forward motion of the wheel should be less than the dimension aligned with the direction of forward motion, the spokes 40 on the left hub flange 61 differ from those on the right hub flange 61, thereby easily resulting in confusion when installing the spokes.

2. There is no doubt that the cross-sectional symmetrical airfoil shape of the intermediate portion 43 of the spoke 40 has improved aerodynamic qualities as compared to the conventional metal spoke 30 described beforehand. However, as shown in FIGS. 10 and 11, the upper transitional portion 42, the spoke fastener 51 and the lower transitional portion 44 maintain their circular cross-sections which can adversely affect the aerodynamic qualities of the spoke 40.

3. The resistance of the spokes 40 to twisting is inadequate. As mentioned beforehand, the spokes 40 are tensed to impart rigidity to the wheel. However, as shown in FIGS. 9 and 11, the nub 46, the bend 45 and the lower transitional portion 44 of the spoke 40 do not contact the hub flange 61 tightly. Thus, the wheel may easily buckle when used in rough road conditions or when subjected to impact.

Dutch Patent No. 1000520 discloses a spoked wheel which includes a wheel rim, a wheel hub and a plurality of spokes that interconnect the wheel rim and the wheel hub. The wheel rim is formed with a plurality of equally displaced through-holes therethrough. The spokes are made integrally from fiber-reinforced plastic and have a stem portion with an oval cross-section. Each of the spokes further has a foot portion which extends from the stem portion and which is provided with an axial screw socket. Each of a plurality of spoke screws has a screw head which is larger than the through-holes in the wheel rim, and a threaded shank which extends through one of the through-holes in the wheel rim so as to engage the screw socket in the foot portion of a respective one of the spokes. The wheel hub includes an axle tube and two side bosses attached respectively to two end portions of the axle tube. Each of the side bosses is formed with a radial hub flange. The hub flange is formed with a plurality of equiangularly displaced circular spoke holes. Each of the spoke holes is confined by a bulging peripheral wall. Each of the spokes further has a head portion connected to the hub flange of one of the side bosses, and a neck portion which interconnects the head portion and the stem portion. The head portion widens gradually from the neck portion. The neck portion is curved and permits extension of the head portion through a corresponding one of the spoke holes in the hub flange of one of the side bosses. The head portion and the neck portion abut respectively against the bulging peripheral wall of the corresponding one of the spoke holes at inner and outer sides of the hub flange.

It is noted that the aforementioned Dutch Patent is silent as to whether the oval cross-section of the stem portion is symmetrical along major and minor axes. As such, the need for different sets of spokes for attachment on the left and right hub flanges is not entirely obviated. Moreover, since the diameter of the head portion is smaller than that of the spoke holes, firm and stable contact between the head portion and the bulging peripheral wall of the corresponding one of the spoke holes cannot be ensured. In addition, the aforementioned Dutch Patent is also silent as to whether the foot portion has a circular cross-section. Thus, the adverse effect of the circular cross-section to the aerodynamic qualities of the spokes may still exist. Finally, due to the wider cross-section of the foot portion as compared to the conventional metal spoke 30 described beforehand, the connection between the wheel rim and the spokes of the aforementioned Dutch Patent may become less stable.

SUMMARY OF THE INVENTION

Therefore, the object of the present invention is to provide a spoked wheel with aerodynamic and rigidity imparting spokes which are capable of overcoming the aforementioned drawbacks that are associated with the prior art.

According, a spoked wheel of the present invention comprises:

- a wheel rim formed with a plurality of equally displaced first through-holes therethrough;
- a wheel hub including an axle tube and two side bosses attached respectively to two end portions of the axle tube, each of the side bosses being formed with a radial hub flange, the hub flange having inner and outer sides and being formed with a plurality of equiangularly displaced spoke apertures, each of the spoke apertures being formed with opposite diverging end sections that are respectively confined by first and second annular inclined faces;
- a plurality of spokes formed integrally from fiber reinforced plastic, each of the spokes including
  - an intermediate portion having uppermost and lowermost sections, and an oval cross-section which has a first major axis parallel to a plane of the spoked wheel and a first minor axis normal to the plane of the spoked wheel, the oval cross-section being symmetrical along the first major and minor axes and having a first width measured in a direction of the first major axis and a first thickness measured in a direction of the first minor axis;
  - a nub having a circular cross-section and an outermost end portion with a diameter larger than that of the spoke apertures, the nub further having a gradually converging connecting end portion formed with a first abutment face for contacting tightly the first inclined face of a corresponding one of the spoke apertures so as to secure the nub on the inner side of the hub flange on one of the side bosses;
  - a bend extending from the connecting end portion of the nub and through the corresponding one of the spoke apertures, the bend interconnecting the nub and the lowermost section of the intermediate portion and having inner and outer sides, the bend changing gradually from the circular cross-section to the oval cross-section and having a second abutment face on the inner side thereof for contacting tightly the second inclined face of the corresponding one of the spoke apertures so as to secure the bend on the outer side of the hub flange on one of the side bosses;
  - a transitional portion extending from the uppermost section of the intermediate portion, and changing gradually from the oval cross-section to an elliptical cross-section which has a second major axis parallel to the plane of the spoked wheel and a second minor axis normal to the plane of the spoked wheel, the elliptical cross-section being symmetrical along the second major and minor axes and having a second width measured in a direction of the second major axis and equal to the first width, and a second thickness measured in a direction of the second minor axis and greater than the first width; and
  - a foot portion extending from the transitional portion and having the elliptical cross-section and a metal fastener axially embedded therein;
- a plurality of washers, each of which is disposed between the wheel rim and a respective one of the spokes, each of the washers being formed with a second through-hole that is registered with a corresponding one of the first through-holes in the wheel rim, and with the metal fastener on the respective one of the spokes, each of the washers having the elliptical cross-section, a bottom face that is in contact with a distal end face of the foot portion of the respective one of the spokes, and a top face that is contoured to correspond with and contact a bottom side of the wheel rim; and
- a plurality of spoke fasteners, each having a head portion which is larger than the first through-holes in the wheel rim, and a shank portion which extends through a respective one of the first through-holes in the wheel rim and through the second through-hole of a respective one of the washers, each of the spoke fasteners engaging the metal fastener on the foot portion of a respective one of the spokes so that the spokes can be placed under tension when connecting the wheel rim to the wheel hub to impart rigidity to the spoked wheel.

BRIEF DESCRIPTION OF THE DRAWINGS

Other features and advantages of the present invention will become apparent in the following detailed description of the preferred embodiment with reference to the accompanying drawings, of which:

FIG. 1 illustrates a conventional spoke;

FIG. 2 is a side view of the conventional spoke shown in FIG. 1;

DETAILED DESCRIPTION OF THE PREFERRED EMBODIMENT

Figure 3:
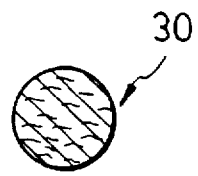
FIG. 3 is a cross-sectional view of the conventional spoke shown in FIG. 2, taken along lines III—III.
Figure 4:
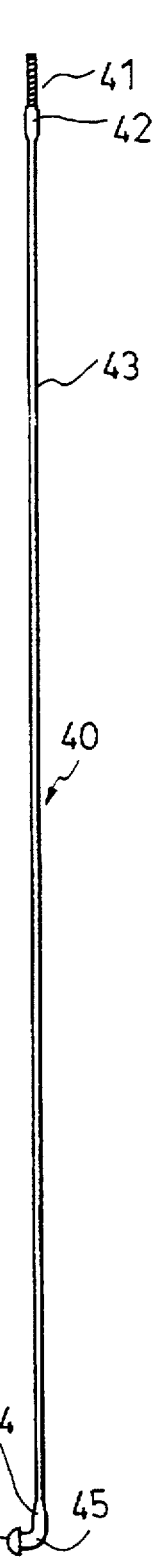
FIG. 4 illustrates another conventional spoke.
Figure 5:
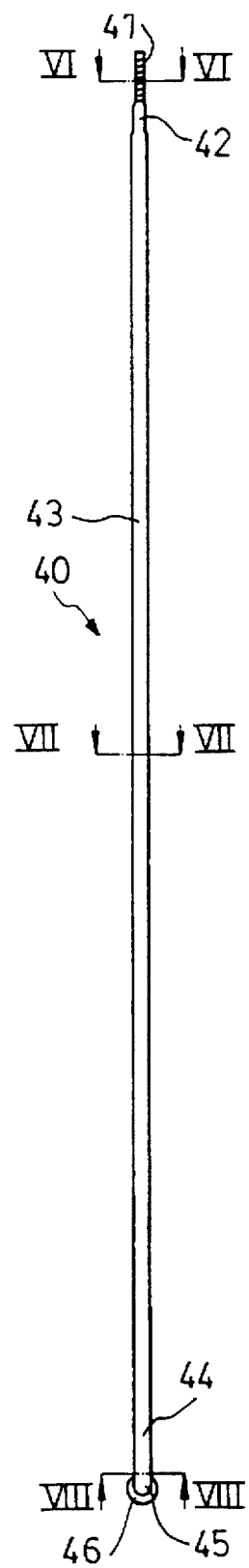
FIG. 5 is a side view of the conventional spoke shown in FIG. 4.
Figure 6:
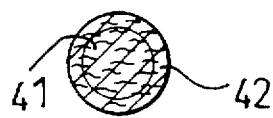
FIG. 6 is a cross-sectional view of the conventional spoke shown in FIG. 4, taken along lines VI—VI.
Figure 7:
FIG. 7 is a cross-sectional view of the conventional spoke shown in FIG. 4, taken along lines VII—VII.
Figure 8:
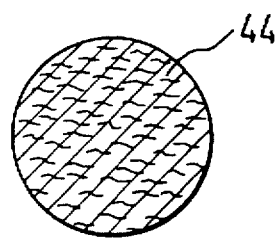
FIG. 8 is a cross-sectional view of the conventional spoke shown in FIG. 4, taken along lines VIII—VIII.
Figure 9:
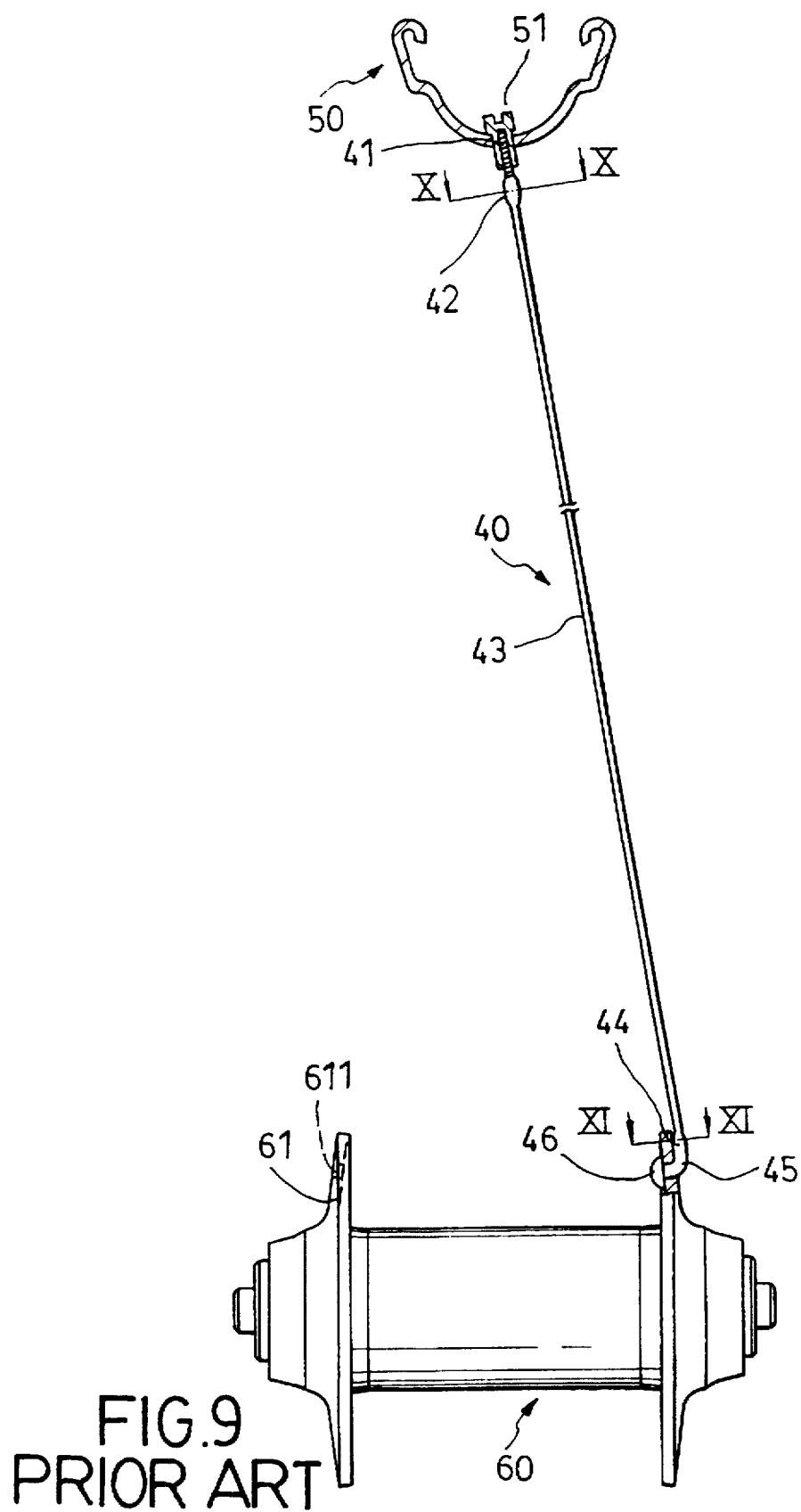
FIG. 9 illustrates how the conventional spoke of FIG. 4 interconnects a wheel rim and a wheel hub.
Figure 10:
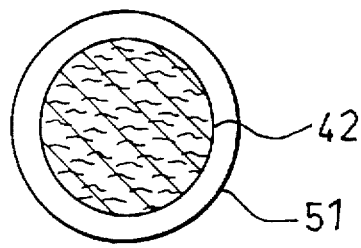
FIG. 10 is a cross-sectional view taken along lines X—X in FIG. 9.
Figure 11:
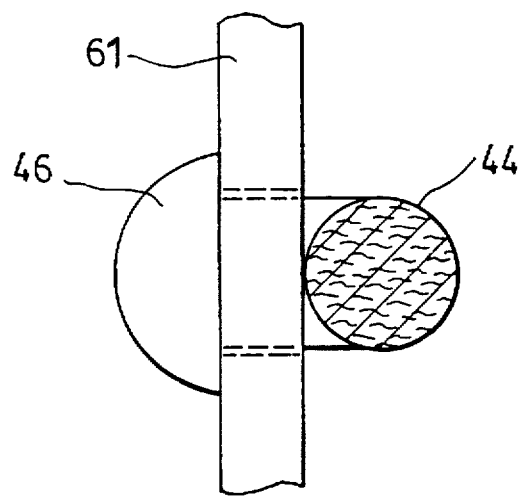
FIG. 11 is a cross-sectional view taken along lines XI—XI in FIG. 9.
Figure 12:
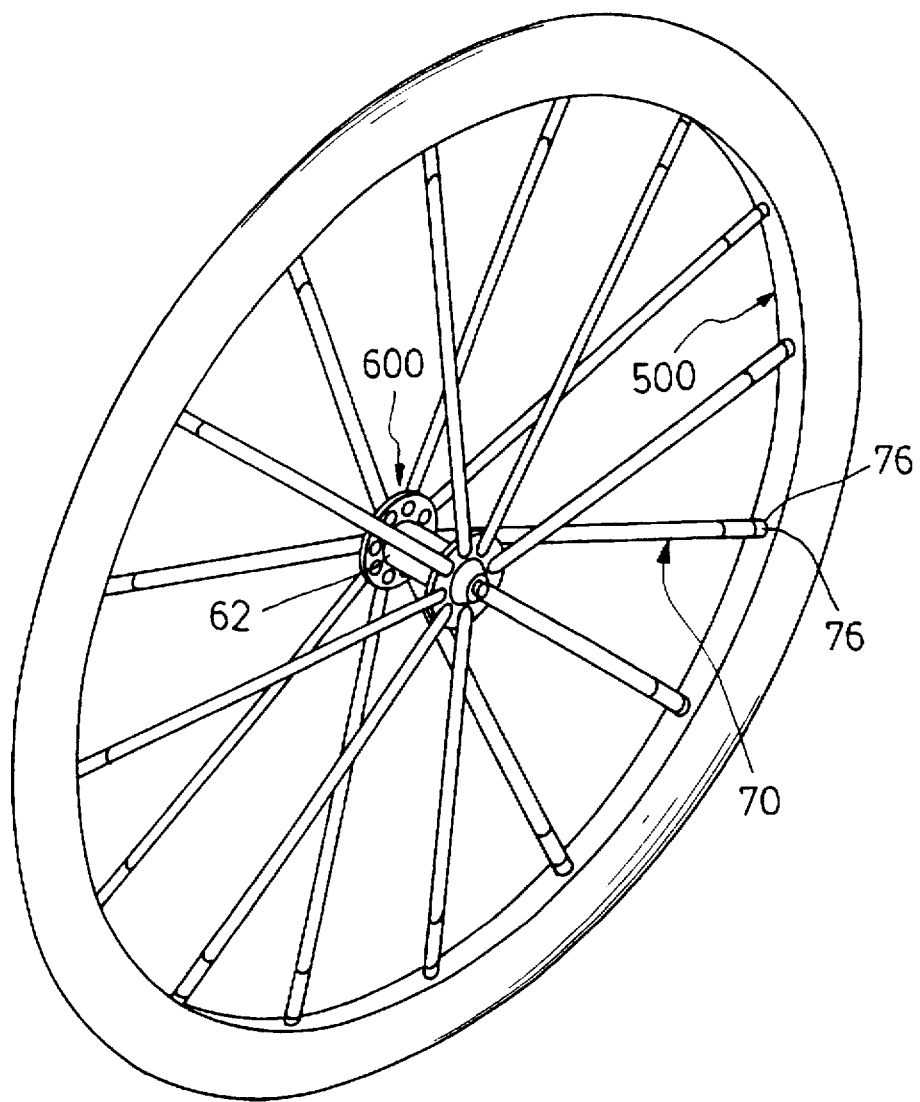
FIG. 12 is a perspective view of the preferred embodiment of a spoked wheel according to the present invention.
Figure 22:
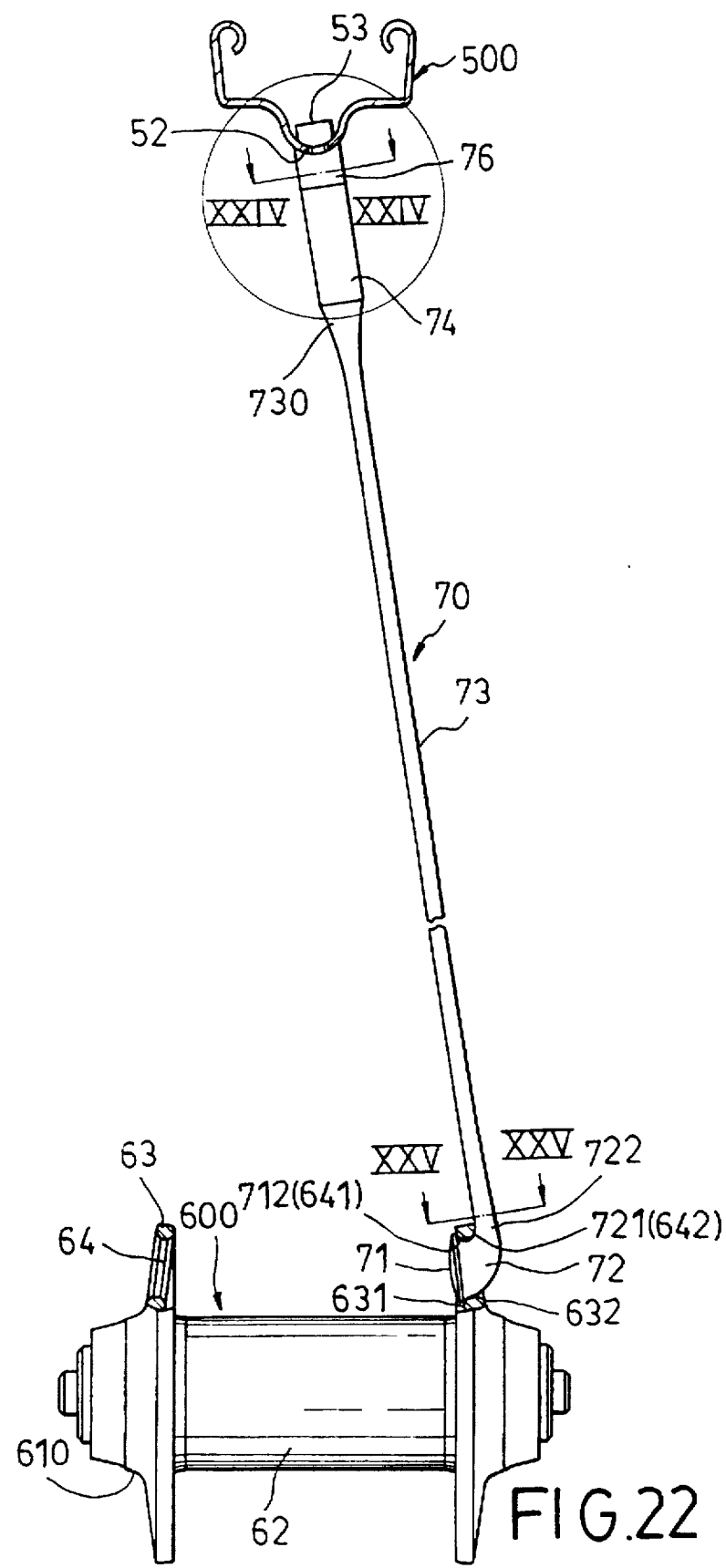
FIG. 22 illustrates how the spoke of FIG. 16 interconnects a wheel rim and the wheel hub of FIG. 14 in accordance with this invention.

Referring to FIGS. 12 and 22, the preferred embodiment of a spoked wheel according to the present invention is shown to comprise a wheel rim 500, a wheel hub 600, a plurality of spokes 70, a plurality of washers 76, and a plurality of spoke fasteners 53.

The wheel rim 500 is a standard generally "v"-shaped rim and is made of an aluminum alloy. The wheel rim 500 is formed with a plurality of equally displaced through-holes 52 therethrough.

Figure 13:
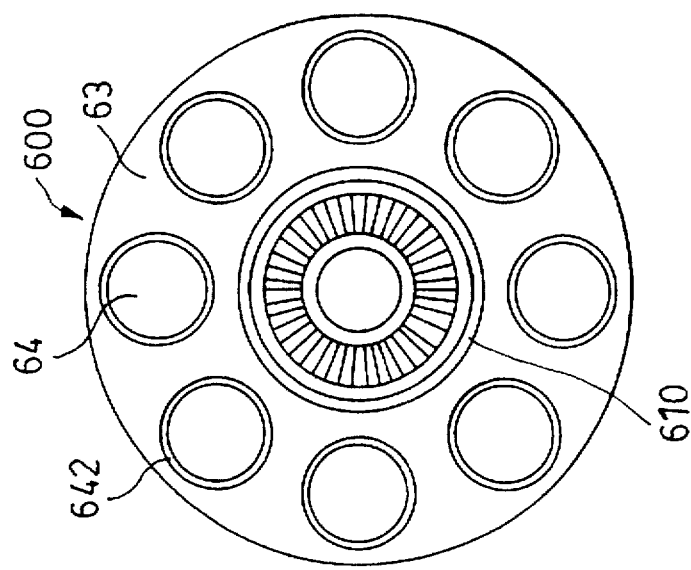
FIG. 13 is a schematic view of a wheel hub of the preferred embodiment.
Figure 14:
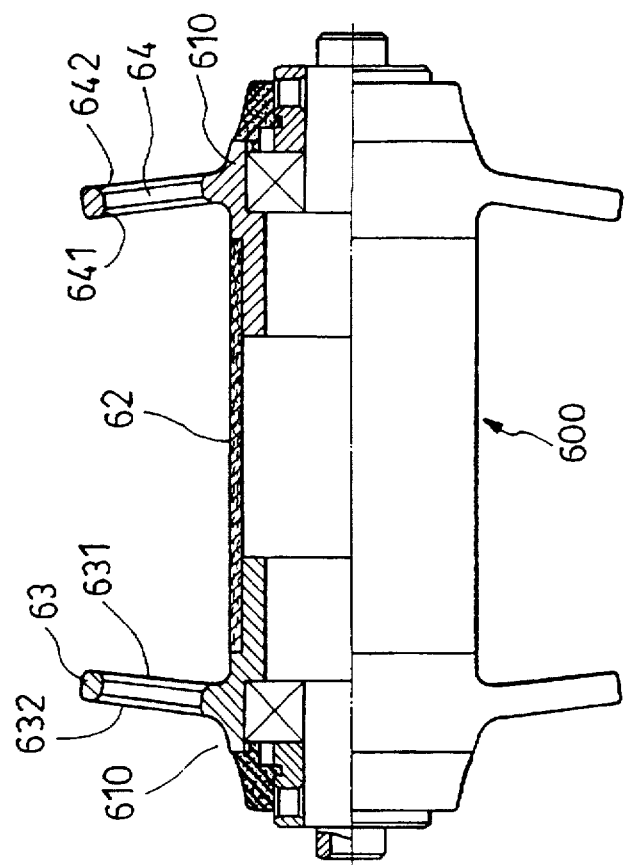
FIG. 14 is a partly sectional side view of the wheel hub of the preferred embodiment.

Referring to FIGS. 13 and 14, the wheel hub 600 includes an axle tube 62 and two side bosses 610 attached respectively to two end portions of the axle tube 62. Each side boss 610 is formed with a radial hub flange 63. The hub flange 63 is formed with a plurality of equiangularly displaced spoke apertures 64. In this embodiment, there are eight spoke apertures 64 in each hub flange 63. In addition, each spoke aperture 64 has a generally circular shape and is about 12.5 mm in diameter. The inner and outer sides 631, 632 of each hub flange 63 undergo finishing so that each of the spoke apertures 64 is formed with opposite diverging end sections that are respectively confined by first and second annular inclined faces 641, 642. In this embodiment, the planes of the first and second annular inclined faces 641, 642 form an angle of 90° therebetween. Preferably, the axle tube 62 is made of fiber reinforced plastic to reduce the weight of the wheel hub 600.

Figure 15:
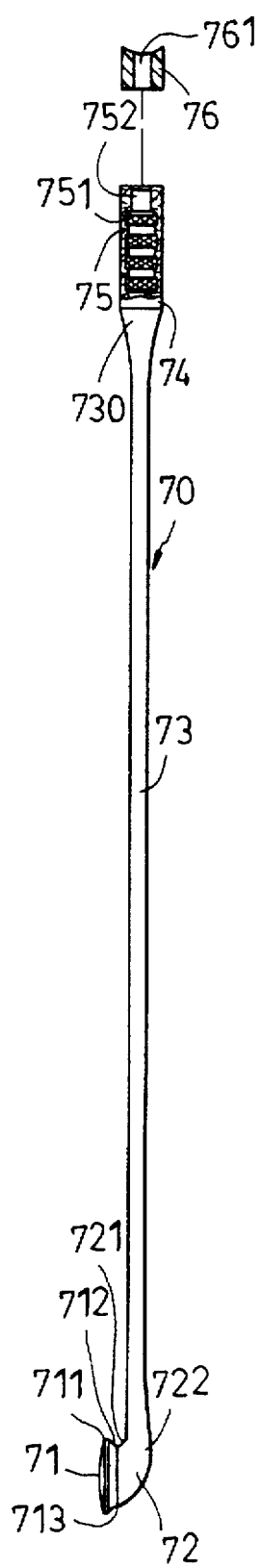
FIG. 15 illustrates a spoke of the preferred embodiment.
Figure 16:
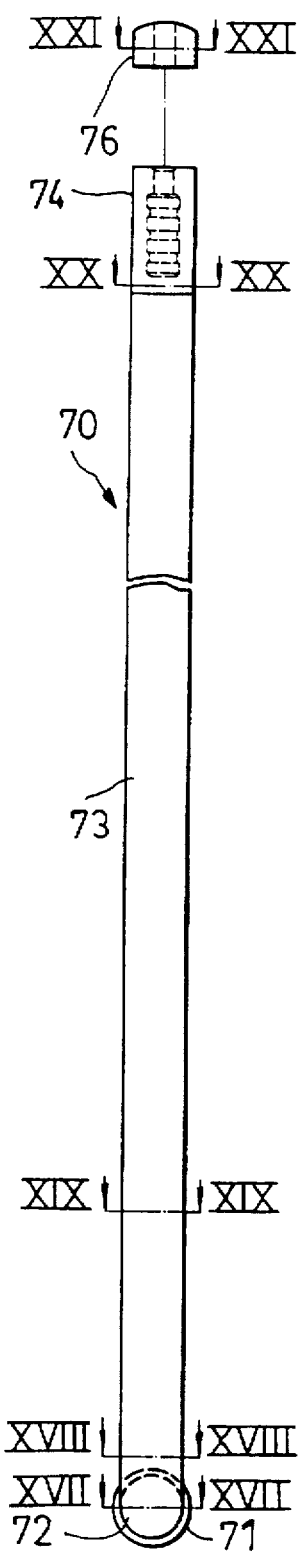
FIG. 16 is a side view of the spoke shown in FIG. 15.

Referring to FIGS. 15 and 16, each spoke 70 is formed integrally from fiber reinforced plastic, such as glass reinforced nylon, and includes a nub 71, a bend 72, an intermediate portion 73 and a foot portion 74. In this embodiment, there are sixteen spokes 70.

Figure 19:
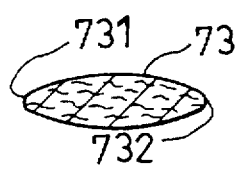
FIG. 19 is a cross-sectional view of the spoke shown in FIG. 16, taken along lines XIX—XIX.

Referring to FIGS. 15, 16 and 19, the intermediate portion 73 has an oval cross-section that increases in thickness from a front tip 731 to a central section and that decreases in thickness from the central section to a rear tip 732. As such, the intermediate portion 73 is not only symmetrical with respect to a major axis which is parallel to a plane of the spoked wheel and which extends between the front and rear tips 731, 732, but is also symmetrical with respect to a minor axis which is normal to the plane of the spoked wheel, transverse to the major axis and between the front and rear tips 731, 732, thereby resulting in an aerodynamic cross-section. In this embodiment, the intermediate portion 73 has a width of 12 mm measured in a direction of the major axis, and a thickness of 3.5 mm measured in a direction of the minor axis.

Referring to again to FIGS. 15 and 16, the nub 71 of this embodiment is shown to be circular in shape and has an outermost end portion with a diameter of 14.5 mm. The nub 71 further has a gradually converging connecting end portion 713 with an inclined first abutment face 712. In this embodiment, the connecting end portion 713 has a minimum diameter of 12 mm, and the first abutment face 712 inclines by an angle of 45°. Referring to FIG. 22, the first abutment face 712 is capable of contacting tightly the first inclined face 641 of the corresponding spoke aperture 64. As such, the nub 71 can be secured to the inner side 631 of the hub flange 63 when the spoke 70 is tensed.

Figure 17:
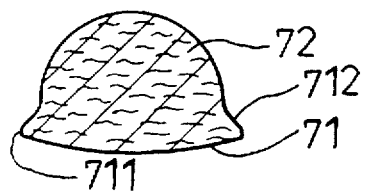
FIG. 17 is a cross-sectional view of the spoke shown in FIG. 16, taken along lines XVII—XVII.
Figure 20:
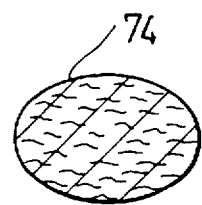
FIG. 20 is a cross-sectional view of the spoke shown in FIG. 16, taken along lines XX—XX.
Figure 18:
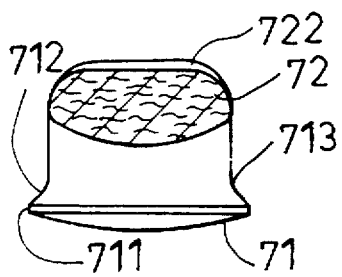
FIG. 18 is a cross-sectional view of the spoke shown in FIG. 16, taken along lines XVIII—XVIII.

As shown in FIGS. 15 and 16, the bend 72 extends from the connecting end portion 713 of the nub 71 and through the corresponding spoke aperture 64. The bend 72 interconnects the nub 71 and a lowermost section of the intermediate portion 73. Referring to FIGS. 17 and 18, the bend 72 changes gradually from the circular cross-section of the nub 71 to the oval cross-section of the intermediate portion 73, thereby forming an inclined second abutment face 721 on an inner side of the bend 72, and a bulging face 722 on an outer side of the bend 72. Referring again to FIG. 22, the second abutment face 721 inclines by an angle of 45°, and is capable of contacting tightly the second inclined face 642 of the corresponding spoke aperture 64. As such, the bend 72 can be secured to the outer side 632 of the hub flange 63 when the spoke 70 is tensed. In this embodiment, the thickest part of the bulging face 722 forms a distance of 3.35 mm with the axis of the intermediate portion 73 to reinforce the bend 72.

Referring to FIGS. 15, 16, 20 and 22, the foot portion 74, which is used for attaching the spoke 70 to the wheel rim 500, is connected to an uppermost section of the intermediate portion 73 via a transitional portion 730. The transitional portion 730 changes gradually from the oval cross-section of the intermediate portion 73 to an elliptical cross-section of the foot portion 74. As such, the foot portion 74 is not only symmetrical with respect to a major axis thereof, but is also symmetrical with respect to a minor axis transverse to the major axis. In this embodiment, the foot portion 74 has a width of 12 mm measured in a direction of its major axis, and a thickness of 8.5 mm measured in a direction of its minor axis. The foot portion 74 is formed with an axial blind bore for receiving a metal fastener 75 therein. In this embodiment, the metal fastener 75 is a screw socket which is formed with an internally threaded screw hole 752. The metal fastener 75 has an outer peripheral surface that is formed with four outwardly protruding and radially extending retaining rings 751. Thus, upon curing of the spoke 70, the foot portion 74 engages the retaining rings 751 to axially embed the metal fastener 75 in the foot portion 74.

Figure 21:
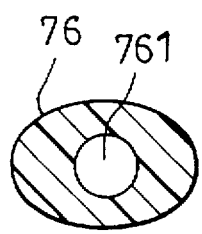
FIG. 21 is a cross-sectional view of a washer shown in FIG. 16, taken along lines XXI—XXI.

Referring to FIGS. 15, 16 and 21, each of the washers 76 is to be disposed between the wheel rim 500 and a respective one of the spokes 70. Each washer 76 is formed with a through-hole 761 that is registered with a corresponding one of the through-holes 52 in the wheel rim 500, and the screw hole 752 in the metal fastener 75 on the respective one of the spokes 70. Preferably, each washer 76 has the elliptical cross-section of the foot portion 74 of the respective spoke 70, a bottom face that is in contact with a distal end face of the foot portion 74 of the respective spoke 70, and a top face that is contoured to correspond with and contact a bottom side of the wheel rim 500.

Figure 23:
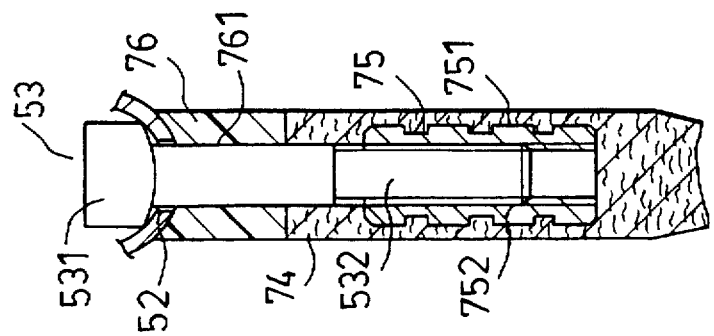
FIG. 23 is a magnified sectional view of an encircled portion found in FIG. 22, illustrating how the spoke of FIG. 16 is secured to the wheel rim.

Referring to FIGS. 22 and 23, each of the spoke fasteners 53 is formed as a screw fastener which has a head portion 531 that is larger than the through-holes 52 in the wheel rim 500, and a threaded shank portion 532 that extends through a respective one of the through-holes 52, the through-hole 761 in a respective one of the washers 76, and that engages threadedly the screw hole 752 in the metal fastener 75 on the foot portion 74 of a respective one of the spokes 70. As such, the spokes 70 can be placed under tension when connecting the wheel rim 500 to the wheel hub 600 to impart rigidity to the spoked wheel.

Figure 25:
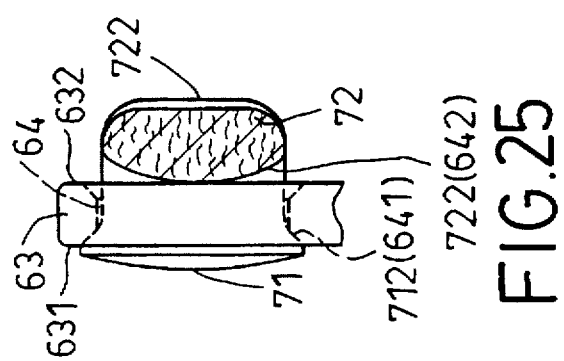
FIG. 25 is a cross-sectional view of the preferred embodiment, taken along lines XXV—XXV.
Figure 24:
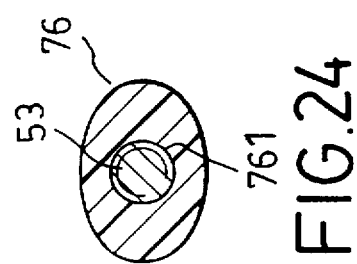
FIG. 24 is a cross-sectional view of the preferred embodiment, taken along lines XXIV—XXIV.

The advantages of the spoked wheel of this invention are as follows:

1. The spokes 70 are convenient to install. It is noted that each of the hub flanges 63 of the wheel hub 600 is only formed with eight spoke apertures 64. Therefore, only sixteen spokes 70 are needed to form the wheel. In addition, since the aerodynamic spokes 70 on the left hub flange 63 are the same as those on the right hub flange 63, confusion can be avoided when installing the spokes 70.
2. As shown in FIGS. 22 and 24, the threaded shank of the first spoke fasteners 53 are concealed within the washers 76 and the foot portions 74 of the spokes 70, which have elliptical cross-sections. As shown in FIGS. 22 and 25, the bend 72 is in tight contact with the outer side 632 of the hub flange 63, the inner sides of portions of the bend 72 that do not engage the hub flange 63 are generally flat, and the bend 72 has rounded corners. Thus, the aerodynamic qualities of the spokes 70 are better than those of the conventional spokes described beforehand.
3. The spokes 70 have better resistance to twisting. As mentioned beforehand, the spokes 70 are tensed to impart rigidity to the wheel. Referring to FIGS. 22 and 25, the nub 71 and the bend 72 have abutment faces 712, 721 that are in tight contact with the inclined faces 641, 642 on the hub flange 63. As such, the nub 71 and the bend 72 are secured to the inner and outer sides 631, 632 of the hub flange 63 when the spoke 70 is tensed. Thus, the spoked wheel does not easily buckle when used in rough road conditions or when subjected to impact. The diameter of the nub 71 is made larger than that of the spoke apertures 64 so that firm and stable contact between the nub 71 and the hub flange 63 can be ensured.
4. The washers 76 ensure stable connection between the wheel rim 500 and the spokes 70 even though the foot portions 74 of the latter have wider cross-sections as compared to the conventional metal spoke 30 described beforehand.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A spoked wheel comprising:
a wheel rim formed with a plurality of equally displaced first through-holes therethrough;
a wheel hub including an axle tube and two side bosses attached respectively to two end portions of said axle tube, each of said side bosses being formed with a radial hub flange, said hub flange having inner and outer sides and being formed with a plurality of equiangularly displaced spoke apertures, each of said spoke apertures being formed with opposite diverging end sections that are respectively confined by first and second annular inclined faces;
a plurality of spokes formed integrally from fiber reinforced plastic, each of said spokes including
an intermediate portion having uppermost and lowermost sections, and an oval cross-section which has a first major axis parallel to a plane of the spoked wheel and a first minor axis normal to the plane of the spoked wheel, the oval cross-section being symmetrical along the first major and minor axes and having a first width measured in a direction of the first major axis and a first thickness measured in a direction of the first minor axis;
a nub having a circular cross-section and an outermost end portion with a diameter larger than that of said spoke apertures, said nub further having a gradually converging connecting end portion formed with a first abutment face for contacting tightly said first inclined face of a corresponding one of said spoke apertures so as to secure said nub on said inner side of said hub flange on one of said side bosses;
a bend extending from said connecting end portion of said nub and through the corresponding one of said spoke apertures, said bend interconnecting said nub and said lowermost section of said intermediate portion and having inner and outer sides, said bend changing gradually from the circular cross-section to the oval cross-section and having a second abutment face on said inner side thereof for contacting tightly said second inclined face of the corresponding one of said spoke apertures so as to secure said bend on said outer side of said hub flange on said one of said side bosses;
a transitional portion extending from said uppermost section of said intermediate portion, and changing gradually from the oval cross-section to an elliptical cross-section which has a second major axis parallel to the plane of the spoked wheel and a second minor axis normal to the plane of the spoked wheel, the elliptical cross-section being symmetrical along the second major and minor axes and having a second width measured in a direction of the second major axis and equal to the first width, and a second thickness measured in a direction of the second minor axis and greater than the first width; and
a foot portion extending from said transitional portion and having the elliptical cross-section and a metal fastener axially embedded therein;
a plurality of washers, each of which is disposed between said wheel rim and a respective one of said spokes, each of said washers being formed with a second through-hole that is registered with a corresponding one of said first through-holes in said wheel rim, and with said metal fastener on the respective one of said spokes, each of said washers having the elliptical cross-section, a bottom face that is in contact with a distal end face of said foot portion of the respective one of said spokes, and a top face that is contoured to correspond with and contact a bottom side of said wheel rim; and a plurality of spoke fasteners, each having a head portion which is larger than said first through-holes in said wheel rim, and a shank portion which extends through a respective one of said first through-holes in said wheel rim and through said second through-hole of a respective one of said washers, each of said spoke fasteners engaging said metal fastener on said foot portion of a respective one of said spokes so that said spokes can be placed under tension when connecting said wheel rim to said wheel hub to impart rigidity to the spoked wheel.

2. The spoked wheel as claimed in claim 1, wherein said first and second annular inclined faces form an angle of 90° therebetween.

3. The spoked wheel as claimed in claim 1, wherein said axle tube is made of fiber reinforced plastic.

4. The spoked wheel as claimed in claim 1, wherein said metal fastener is an internally threaded screw socket, and each of said spoke fasteners is an externally threaded screw fastener which engages threadedly said metal fastener on said foot portion of the respective one of said spokes.

\* \* \* \* \*